Patented Nov. 24, 1942

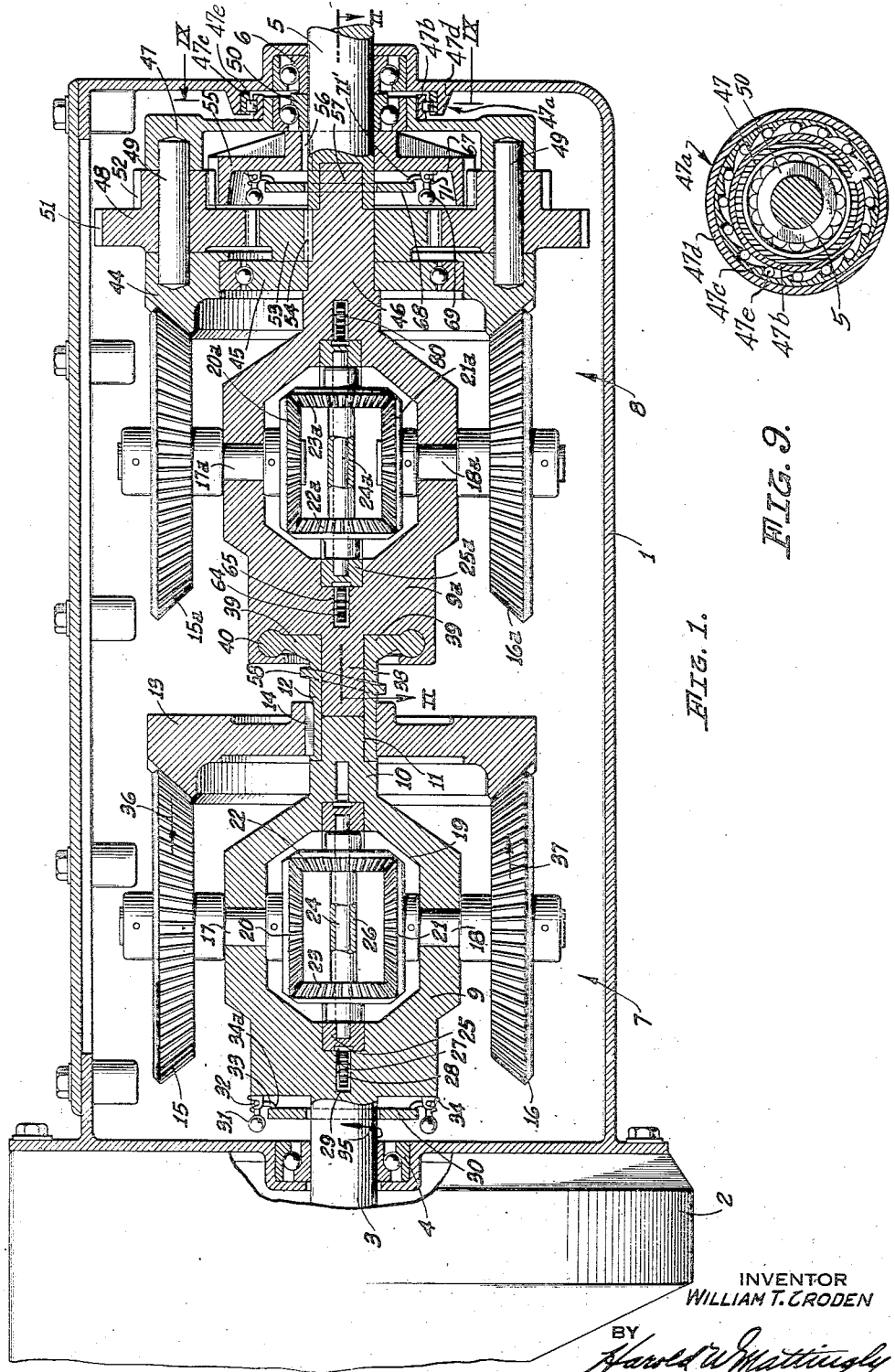

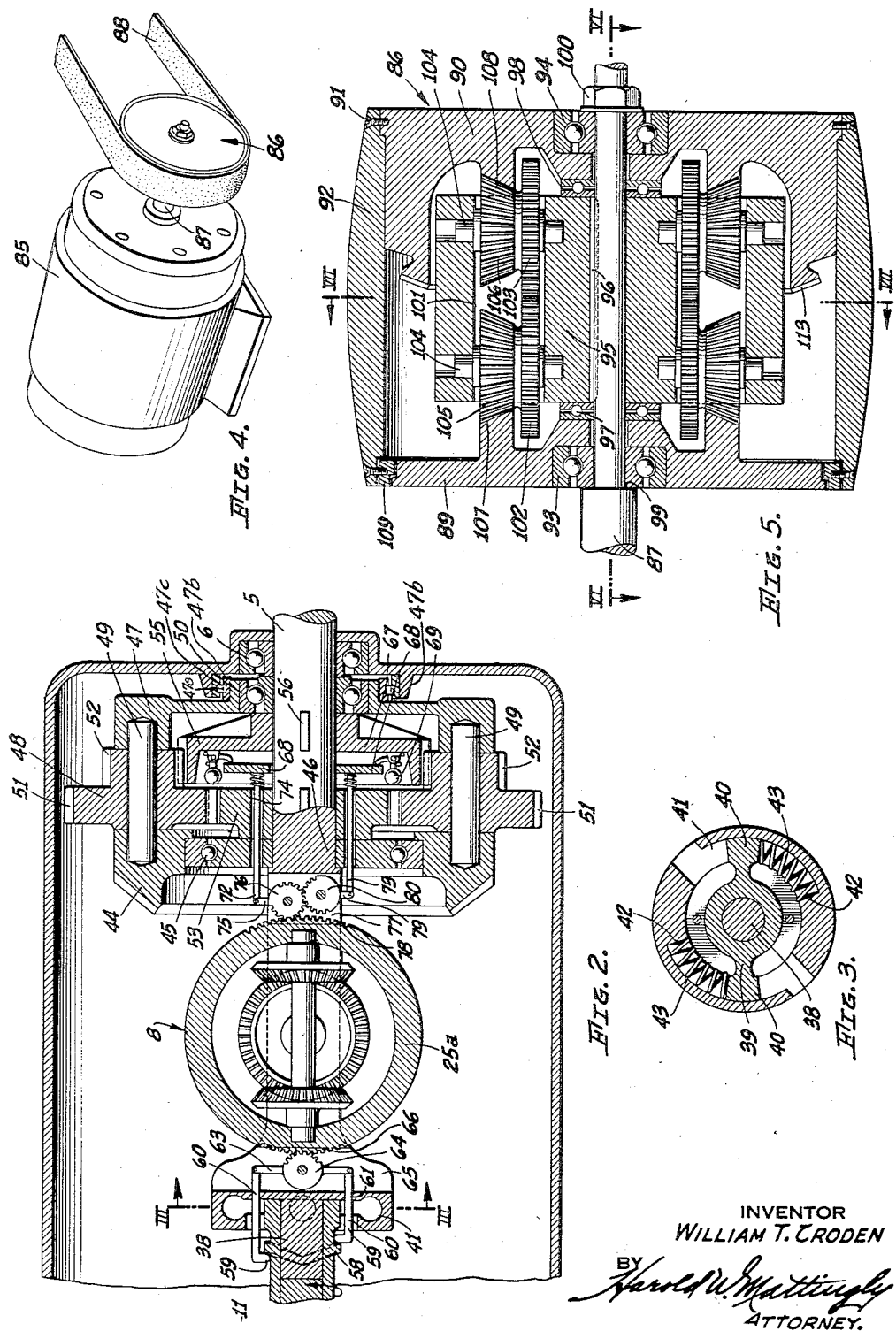

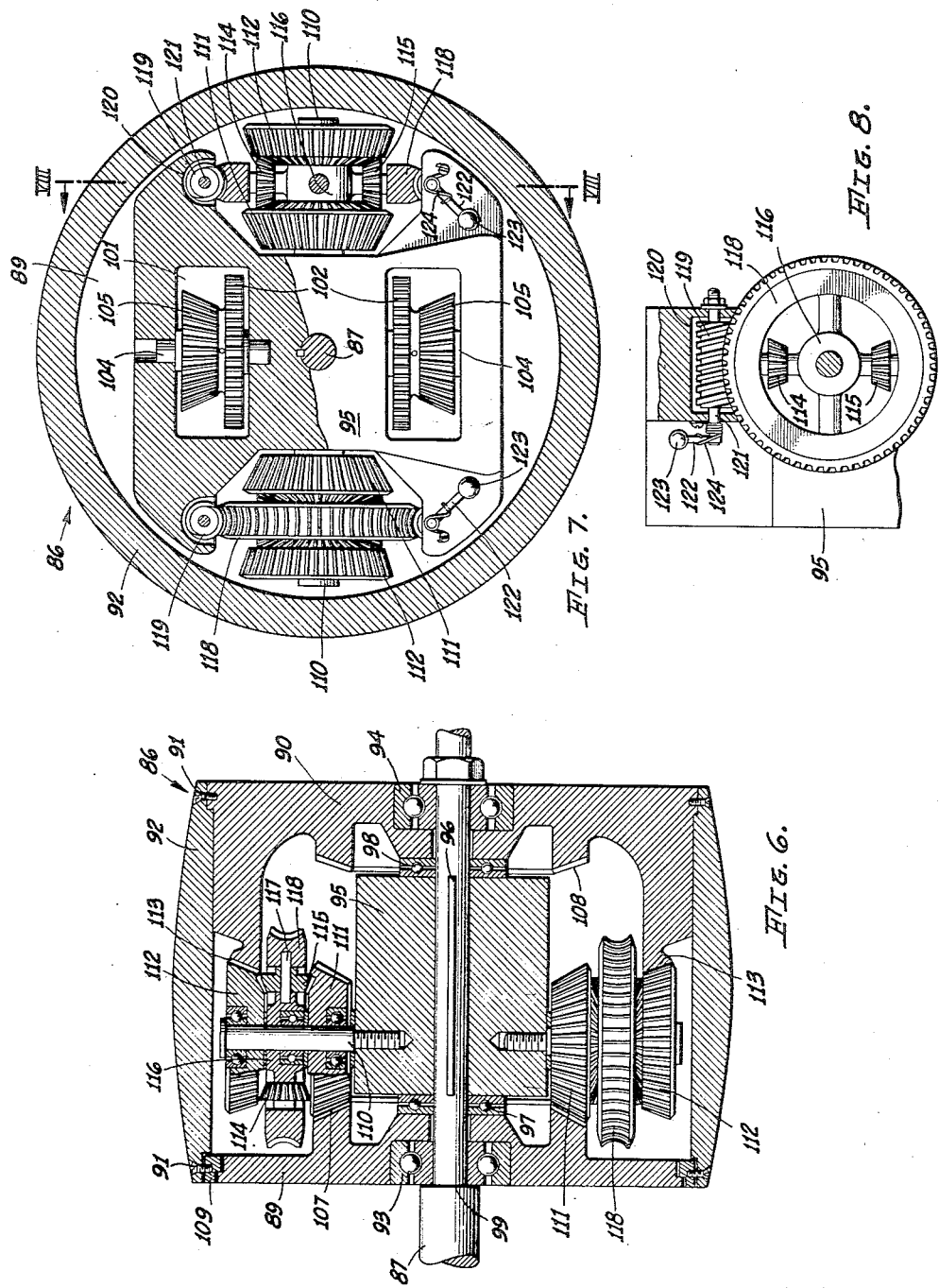

2,303,026

UNITED STATES PATENT OFFICE 2,303,026

POWER TRANSMISSION SYSTEM

William T. Croden, Earp, Calif., by decree of court to Amelia Croden, widow of said William T. Croden, deceased Application August 11, 1941, Serial No. 406,298

12 Claims. (Cl. 74—260)

My invention relates to a power transmission system and has particular reference to a transmission mechanism of the variable ratio type wherein the drive ratio may be continuously varied over a wide range.

In certain power transmission systems such as that employed on motor vehicles, for example, there is a long felt need for a device which will permit the drive ratio between the driven and power take-off shafts to be continuously varied over a wide range to provide an infinite number of available drive ratios in contra-distinction to the present conventional construction wherein there is provided only three or four predetermined available drive ratios.

Prior attempts to provide such a transmission system have, in general, been limited to friction drive units such as belt and pulley arrangements and friction disk drives. These friction drives are subject to slippage and consequent wear and power loss and no one prior to my invention has, to my knowledge, devised a variable ratio transmission wherein a positive connection such as a geared connection is at all times provided between the driven and power take-off shifts.

One form of early device directed to providing a continuously variable drive ratio comprised the so-called "planetary" transmission. These transmissions were in reality differential units wherein power applied to one shaft was taken off at a second shaft whenever the third shaft was frictionally held against rotation. By allowing the third shaft to slowly rotate a reduction in speed of the power take-off shaft was obtained. This reduction would not, however, result from a change in the drive ratio but instead resulted from diverting a part of the power to the third shaft where it was converted to heat by the friction device and wasted.

The present invention is directed to overcoming the above noted disadvantages and has for an object the provision of a variable ratio transmission system wherein the driven shaft is positively connected to the power take-off shaft and wherein a change in rotational speed of one shaft with respect to the other is obtained by an actual change in drive ratio between the shafts.

It is also an object of my invention to provide a transmission system wherein the drive ratio is continuously variable from one limit whereat the power take-off shaft is stationary to another limit whereat the speed of the power take-off shaft bears a predetermined ratio to the speed of the driven shaft.

It is a still further object of my invention to provide a power transmission system of the character set forth in the preceding paragraphs which includes a means for varying the drive ratio in accordance with the torque transmitted by the system.

It is an additional object of my invention to provide a transmission system of the character set forth hereinbefore which includes a means for varying the drive ratio in response to speed changes.

It is also an object of my invention to provide a device of the character set forth in the preceding paragraphs which includes a speed responsive means for providing a fixed drive ratio at speeds exceeding a predetermined speed.

It is a still further object of my invention to provide a transmission system which includes a rotating driving member rotatably supporting a pair of driving gears each engaged with a driven gear, together with means for angularly shifting one of said driving gears with respect to the other.

It is additionally an object of my invention to provide a mechanism of the character set forth in the preceding paragraph which includes a rotating driving member rotatably supporting a pair of driving gears each engaged with a driven gear, together with means for applying to said driving gears a torque tending to prevent rotation thereof.

It is also an object of my invention to provide a mechanism of the character set forth in the preceding paragraphs wherein spider gears carried by a spider are employed to interconnect the driving gears, together with means for angularly shifting the spider relative to the driving means.

Other objects and advantages of my invention will be apparent from a study of the following specifications, read in connection with the accompanying drawings, wherein:

Fig. 1 is a longitudinal sectional view illustrating my invention as embodied in an automatic transmission system particularly adapted for use in motor vehicles;

Fig. 2 is a sectional view taken substantially along the line II—II of Fig. 1 to illustrate additional details of construction;

Fig. 3 is a fragmentary cross sectional view taken substantially along the line III—III of Fig. 2;

Fig. 4 is a perspective view illustrating my invention as embodied in an automatic clutch device interposed between the shaft of an electric motor or other suitable source of motive power and a pulley or similar driving device to be coupled to the motor;

Fig. 5 is a longitudinal sectional view of the pulley and clutch device illustrated in Fig. 4;

Fig. 6 is a sectional view taken substantially along the line VI—VI of Fig. 5;

Fig. 7 is a cross sectional view taken substantially along the line VII—VII of Fig. 5;

Fig. 8 is a fragmentary sectional view taken substantially along the line VIII—VIII of Fig. 7; and Fig. 9 is a fragmentary cross sectional view taken substantially along the line IX—IX of Fig. 1.

Referring to the drawings, I have illustrated in Fig. 1 a transmission system embodying my invention which is particularly adapted for use in motor vehicles. The transmission system is illustrated as being enclosed within a suitable housing or closure 1 which may in turn be attached to and supported from a flywheel housing 2 forming a part of a conventional motor vehicle gasoline engine adapted upon operation to produce rotation of its driving shaft 3.

The driving shaft 3 is journaled within the housing 1 as by means of a ball thrust bearing 4 and is coupled by instrumentalities to be hereinafter described to a power take-off shaft 5 which may be journaled as by means of ball thrust bearings 6 supported in the opposite end of the housing 1, the power take-off shaft being coupled by any suitable means such as a universal joint (not shown) to the propeller shaft of the motor vehicle.

The housing 1 encloses an automatic clutch device indicated generally by reference character 7 which is connected between the driving shaft 3 and an automatic speed changing mechanism indicated generally by reference character 8, which latter mechanism is in turn connected to the power take-off shaft 5.

The driving shaft 3 is connected with a yoke member 9 which may be, if desired, formed integrally with the shaft 3 or may be attached thereto by any suitable means. The opposite end of the yoke member 9 is provided with a shaft-like portion 10, the outermost end of which is reduced in diameter as indicated at 11 to be received within a hollow shaft 12 to which a bevel or ring gear 13 is fixed as by means of a key 14.

The ring gear 13 meshes with a pair of opposed driving gears 15 and 16 which are secured to shafts 17 and 18 journaled within the yoke member 9. The innermost ends of the shafts 17 and 18 extend into an opening 19 formed in the yoke member 9 and serving to house a pair of control gears 20 and 21 secured to the shafts 17 and 18, respectively. The control gears 20 and 21 are drivably connected with each other by means of spider gears 22 and 23 which are in turn supported for free rotation upon a spider mechanism which may include a shaft 24 extending diametrically across and supported by a ring member 25. A sleeve 26 may be placed about the shaft 24 between the gears 22 and 23 to maintain these gears in the proper spaced relation relative to each other.

The ring member 25 is disposed coaxially with the shafts 17 and 18 and is suitably supported within the yoke member 9 for partial rotation or angular shifting about its axis. At least a portion of the outer periphery of the ring member 25 is formed with gear teeth 27 which mesh with a sector gear 28 pivotally supported within a suitable opening 29 formed in the yoke member 9. The sector gear 28 is provided with an integrally formed lever portion (not shown) which is drivably connected as by means of links (not shown) to a thrust ring 30 disposed in encircling relation with the driving shaft 3. The thrust ring 30 is adapted to be shifted axially of the driving shaft 3 by means of a centrifugal mechanism which may include a plurality of weights or fly balls 31 pivotally supported as by means of pins 32 and brackets 33 from the yoke member 9 and normally urged to an inward position such as that illustrated in Fig. 1 as by means of hairpin springs 34. The fly balls 31 are connected to pressure fingers 34a which bear against the inner face of the thrust ring 30 to move the ring 30 axially to the left as viewed in Fig. 1 whenever the fly balls 31 are moved outwardly as a result of centrifugal force produced by a rotation of the yoke member 9.

With the parts in the positions illustrated in Fig. 1, rotation of the driving shaft 3 in the direction indicated by arrow 35 in Fig. 1 produces a corresponding rotation of the yoke member 9 and causes the gears 15 and 16 to be rolled about the ring gear 13. Assuming that there is available some force tending to prevent rotation of the ring gear 13, it will be seen that as the gears 15 and 16 are moved about the periphery of the ring gear 13, the gears 15 and 16 will be caused to rotate about their own axes in the directions indicated by arrows 36 and 37 in Fig. 1. This will, of course, produce a corresponding rotation of the gears 20 and 21, this rotation being in opposite directions and being permitted by the mounting of the spider gears 22 and 23 for free rotation about the spider shaft 24. As the speed of the driving shaft 3 is increased, the fly balls 31 move outwardly and so shift the thrust ring 30 to the left as viewed in Fig. 1.

This motion of the thrust ring is translated by means of the link and lever connection into a partial rotation of the sector gear 28 which in turn, being meshed with the gear teeth 27, produces an angular shifting of the spider shaft 24 about the axis of the gears 20 and 21. This produces an angular shifting of the spider gears 22 and 23 which, by reason of their being meshed with the control gears 20 and 21, serves to angularly shift the driving gears 15 and 16 in the same direction.

These gears are, by virtue of their engagement with the ring gear 13, rotating in opposite directions so that the angular shift of these gears serves first to take up whatever play or slack there may be in the gear teeth and then to apply a torque to the driving gears tending to resist rotation of these gears with respect to the ring or driving gear 13. This torque tends to overcome such force as may be preventing rotation of the ring gear 13 and this driving torque steadily increases as the speed of the driving shaft 3 increases and as the angular shift of the spider shaft 24 is thereby further increased. The result is to gradually apply to the ring gear 13 a driving torque which is steadily and continuously increased as the speed of the driving shaft 3 is increased, with the result that the ring gear 13 will begin to rotate and so drive such load as may be drivably connected to the ring gear 13.

If desired the ring gear 13 and the sleeve 12 to which it is secured may be drivably connected to the propeller shaft of the motor vehicle. In the form of the invention shown, however, the sleeve 12 is drivably connected to the change speed mechanism 8, which mechanism may include a yoke member 9a rotatably supporting shafts 17a and 18a each carrying driving gears 15a, 16a and control gears 20a and 21a, the control gears being interconnected by means of spider gears 22a and 23a journaled for rotation upon a spider shaft 24a carried in a shiftable ring 25a, this yoke and gearing mechanism being substantially identical in construction with that previously described.

The left end of the yoke member 9a is formed with a pin-like shaft portion 38 which is journaled for rotation within the sleeve member 12. The sleeve member 12 is formed with a plurality of outwardly extending arms 39 which terminate in lug portions 40. The lug portions 40 are received within an arcuate channel 41 (see Fig. 3) which is formed in the end of the yoke member 9a. The arcuate channels 41 are of limited peripheral extent, being closed at one end by integrally formed stop members 42. Suitably shaped compression springs 43 are interposed between each of the stop members 42 and the corresponding lug 40 so that as the sleeve 12 is rotated by the ring gear 13, the torque is transmitted to the yoke member 9a through the compression springs 43, thereby producing an angular shift of the sleeve 12 with respect to the yoke member 9a, the magnitude of which angular shift is a measure of the torque transmitted to the yoke member 9a. This torque measurement is employed to control the operation of the change speed mechanism 8 in a manner to be described hereinafter. This change speed mechanism also includes a ring gear 44 which is journaled for rotation as by means of suitable bearings 45 upon a shaft extension portion 46 of the yoke member 9a.

The ring gear 44 cooperates with a carrier 47 to rotatably support a plurality of compound planet gears 48 which are journaled for free rotation upon stub shafts 49 which are extended between the ring gear 44 and the plate 47, the plate 47 being suitably journaled upon the power take-off shaft as by means of ball thrust bearings 50.

The carrier 47 is preferably restrained against reverse rotation with respect to the housing 1, forward rotation being considered as rotation in the direction indicated by the arrow 35. Accordingly an over-running clutch of conventional construction and indicated generally by the reference character 47a is interposed between the carrier 47 and the housing 1. The over-running clutch may comprise an inner circular race member 47b frictionally secured to the carrier 47. A cooperating external race member 47c is frictionally secured to a suitable boss 47d formed integrally with the housing 1.

Referring to Fig. 9 it will be noted that the inner race 47b is circular, whereas the outer race 47c is saw-tooth in form and that a plurality of rollers 47e are interposed between the races 47b and 47c.

When the carrier 47 is rotated in the forward direction indicated by the arrow 35, the rollers 47e roll to the larger end of the individual spaces between the races 47b and 47c so as to permit free rotation of the carrier 47. In the event the carrier 47 attempts to rotate in a reverse direction, the rollers 47e are caused to progress to the smaller end of the tapered openings within which they are received and so wedge into these tapered openings and lock the inner race 47b to the outer race 47c, thus securely holding the carrier 47 against reverse rotation.

Each of the planet gears 48 includes a large diameter gear portion 51 and an integrally formed small diameter gear portion 52, the large portion 51 being meshed with a sun gear 53 which is secured as by means of a key 54 to the shaft portion 46, and the small diameter gear portion 52 being drivably engaged with a driven gear 55 which is secured as by means of a key 56 to the power take-off shaft 5. The yoke 9a may be journaled and held in axial alignment with the power take-off shaft 5 by forming the shaft portion 46 thereof with a reduced diameter portion 57 which is rotatably received within a suitable cylindrical socket formed in the innermost end of the power take-off shaft 5.

It will be observed that as the yoke 9a is rotated, the gears 15a and 16a will roll about the periphery of the ring gear 44 in the same manner as that previously described in connection with the gears 15, 16 and the ring gear 13 so as to transmit substantially no torque to the ring gear 44. However, the sun gear 53 being secured to the shaft portion 46 will be rotated with the yoke 9a and will so rotate the planet gears 48, the carrier 47 being held against reverse rotation by the overrunning clutch device 47a. Rotation of the planet gears 48 is transmitted to the power take-off shaft 5 through the medium of the driven gear 55.

The relative diameters of the gears 53 and 55 and the gear portions 51 and 52 of the planet gears 48 is so adjusted as to provide a reduced drive ratio between the shaft portion 46 and the power take-off shaft 5. Thus, whenever the driving shaft 3 is rotated at a sufficient speed to cause engagement of the clutch mechanism 7 and the consequent rotation of the driven gear 13, the power take-off shaft 5 will be positively driven at a reduced speed ratio through the aforementioned speed reduction mechanism.

As the vehicle gradually accelerates and the torque resisting rotation of the power take-off shaft 5 reduces, it is intended that the speed change mechanism 8 operate automatically to provide a direct connection between the shaft portion 46 and the power take-off shaft 5. This change in speed ratio is effected by the torque measurement represented by the angular shift of the driving sleeve 12 with respect to the yoke 9a.

The driving sleeve 12 is formed with a radially disposed shoulder 58 which is extended circumferentially about the sleeve portion 12 in the form of a pair of opposite handed half turn helices. This shoulder engages the inwardly turned ends 59 of a pair of link members 60, which members are slidably supported within suitable apertures 61 formed in the yoke member 9a. The innermost ends of the links 60 are pivotally attached to lever portions 63 formed integrally with a sector gear 64 which is pivotally supported within a suitable opening 65 formed in the yoke member 9a, the sector gear 64 being meshed with gear teeth 66 formed in the outer periphery of the ring member 25a.

The compression springs 43 acting on the lug portions 40 serve to normally so position the sleeve 12 that the shoulder 58, links 60 and sector gear 64 cooperate to hold the ring member 25a in a position shifted clockwise from a neutral position. This clockwise shift of the ring member 25a is sufficient to cause a direct driving engagement between the yoke member 9a and the ring gear 44, this driving engagement resulting from the torque which is applied by the shift of the ring member 25a to the gears 15a and 16a and tending to prevent rotation of these gears in the manner previously described in connection with the gears 15, 16 and 13 of the clutch mechanism 7.

When a sufficient torque is applied to the sleeve 12 the resulting angular shift of the shoulder 58 will permit the links 60 to move and will permit the ring member 25a to shift in a counter-clockwise direction to a neutral position allowing the gears 15a and 16a to freely rotate and so transmit very little, if any, torque directly to the ring gear 44, whereupon the power take-off shaft 5 is driven through the medium of the speed reducing mechanism comprising the gears 48, 53 and 55.

As the torque which is applied by the load tending to resist rotation of the yoke member 9a gradually reduces with an increase in speed of the mechanism, the springs 43 serve to reverse the direction of angular shift of the sector gear 64 and produce a clockwise shift of the ring member 25a to thereby produce a torque resisting rotation of the gears 15a and 16a and tending to cause the ring gear 44 to be rotated with the yoke member 9a. When the torque transmitted by the movement has fallen to a predetermined minimum value, the torque transmitted to the ring gear 44 will be sufficient to cause the ring gear 44 to rotate in synchronism with the yoke member 9a. Since the planet gears 48 are carried by the ring gears 44, these will also be rotated in synchronism with the yoke 9a and so provide a direct connection between the yoke member 9a and the power take-off shaft 5.

In the embodiment of my invention which is illustrated in Fig. 1 I have included also a superseding speed responsive mechanism which serves to provide this direct driving engagement between the yoke 9a and the power take-off shaft 5 whenever the speed of the power take-off shaft 5 rises to a predetermined value. Accordingly the gear 55 is recessed on one face as indicated by reference character 67 to provide a space for enclosing a thrust plate 68 which is disposed in encircling relation with the shaft 5.

The thrust plate 68 coacts with a centrifugal mechanism including pivotally supported fly balls 69 urged to an inward position by means of springs 71 and carrying pressure fingers 71' bearing against the rear face of the thrust plate 68 and serving to urge that plate to the left as viewed in Fig. 1 whenever the fly balls 69 are moved outwardly in response to rotation of the shaft 5 at a speed sufficient to overcome the effect of the springs 71.

To the thrust plate 68 there is secured a pair of push rods 72 and 73 which are extended through suitable apertures 74 formed in the gear 53 and the inner race of the bearing member 45. The push rod 72 is pivotally connected to a lever portion 75 of a sector gear 76 which is pivotally supported within a suitable slot or opening 77 formed in the yoke member 9a in a position to mesh with gear teeth 78 formed on the periphery of the ring 25a. The push rod 73 is similarly connected to a lever portion 79 of a sector gear 80 which is meshed with the sector gear 76. Thus, as the thrust plate 68 is moved axially to the left as viewed in Figs. 1 and 2, the sector gear 76 will be rotated in a counter-clockwise direction to produce a clockwise rotation of the ring 25a to thereby produce a direct driving engagement between the yoke 9a and the power take-off shaft 5 in the manner previously described.

The centrifugal mechanism including the fly balls 69 is preferably so adjusted as to effect this direct driving engagement whenever the speed of the power take-off shaft 5 is raised to above a predetermined value. It will be noted that the centrifugal mechanism serves to shift the ring 25a in the same direction as it is shifted by the springs 43 of the torque responsive mechanism so that whenever the speed of the power take-off shaft 5 rises to a sufficient value to permit the centrifugal mechanism to effect the direct driving engagement between the yoke member 9a and the power take-off shaft 5, the torque control mechanism will be superseded and will thereafter be inoperative to effect a speed reduction through the gears 48, 53 and 55 if the torque transmitted were to rise above the predetermined maximum value previously referred to.

The preceding description has been limited to describing the operation of the mechanism of my invention in its limiting conditions; that is, when in the one case the gears 15 and 16 or 15a and 16a are permitted to freely rotate and in the other instance when these gears are locked against rotation. It is desired at this time to point out that during the transition between these two limits the driving gears will slowly rotate and that the relative speeds of rotation of the yoke member and the driven gear will be in turn determined by the speed of rotation of the driving gears 15—16 or 15a—16a. Thus, the device operates to produce a continuously varying drive ratio or, as this result is hereinafter referred to, serves to unlimitedly vary the drive ratio within a predetermined range of drive ratios.

This mechanism is to be distinguished from the old type of planetary transmissions wherein a diversion of power was effected and a part of the power was dissipated as heat in the friction device which served to prevent rotation of the third shaft of the differential mechanism employed. No power is wasted in the mechanism previously described. This results from the fact that the speed of rotation of the gears 15—16 or 15a—16a is determined by a counterbalancing torque applied thereto by the shifting of the spider gears 22—23 or 22a—23a. Since this torque is not accompanied by any relative movement but is instead merely a static torque, no work is done thereby and no power is consumed. It is thus seen that the device operates to produce a change in drive ratio which may be changed in a smooth and continuous manner between the available limits in contra-distinction to conventional transmission mechanisms wherein there is provided only a selection of a plurality of available ratios.

I have illustrated in Figs. 4 through 8 an automatic clutch or transmission mechanism embodying the same principles as above described but particularly adapted for use as a speed responsive coupling between an electric motor or other source of power and a load connected thereto. Fig. 4 illustrates a motor 85 as having a pulley 86 secured to its shaft 87, the pulley 86 providing for a belted connection of the motor 85 to a load to be driven thereby through the medium of a belt 88.

As is illustrated in Fig. 5, the pulley 86 is hollow, being formed of axially spaced ring gear members 89 and 90 to the latter of which is secured as by means of screws 91 a pulley rim member 92. The ring gear members 89 and 90 are journaled for free rotation upon the shaft 87 of the motor as by means of ball bearings 93 and 94. Between the ring gear members 89 and 90 there is positioned a rotatable member 95 which is fixed on the shaft 87 as by means of a key 96. Thrust bearings 97 and 98 may be interposed between the rotatable member 95 and the ring gears 89 and 90 and the complete assembly may be locked against a shoulder 99 formed on the shaft 87 as by means of a nut 100 threadedly engaged with the outermost end of the shaft.

The rotatable member 95 is provided with a pair of openings 101 within which are positioned a pair of inter-meshed spur gears 102 and 103, these gears being supported upon suitable shafts 104 fixed in the rotatable member 95. Attached to the spur gears 102 and 103 are bevel gears 105 and 106 positioned to mesh respectively with angularly disposed gear teeth 107 and 108 formed on the ring gear members 89 and 90.

It will be noted that this gearing arrangement serves to drivably interconnect the ring gear members 89 and 90 to force these gears to rotate in synchronism with each other whenever they are caused to rotate relative to the motor shaft 87. The ring gear 89 is, however, permitted to angularly shift a slight amount with respect to the ring gear 90 and for this reason there is interposed between the periphery of the ring gear 89 and the under surface of the pulley rim member 92 a suitable journal ring 109.

The rotatable member 95 also supports a pair of stub shafts 110 upon each of which is independently journaled a pair of bevel gears 111 and 112, the former being meshed with the gear teeth 107 of the ring gear 89 and the latter being meshed with gear teeth 113 formed on the ring gear member 90. The diameters of the gears 111 and 112 are so proportioned with respect to the diameters of the gears 107 and 113 as to cause the gears 111 and 112 to be rotated at the same speed but in opposite directions whenever the rotatable member 95 is rotated with respect to the synchronized ring gears 89 and 90.

The gears 111 and 112 are inter-engaged with each other as by means of spider gears 114 and 115, both meshing with suitable gear teeth formed on the upper and under surfaces, respectively, of the gears 111 and 112. The spider gears 114 and 115 are journaled for independent rotation upon a spider 116 which is supported for free movement about the stub shaft 110 independently of the gears 111 and 112. The spider 116 includes shaft-like portions 117 upon which the spider gears 114 and 115 are mounted, these shaft-like portions being extended into engagement with a worm gear 118 which is concentrically disposed with respect to the shaft 110.

The worm gear 118 is meshed with worms 119 disposed in suitable openings 120 formed in the rotatable member 95 (see Fig. 8) and secured to control shafts 121 journaled for rotation in the member 95. The control shafts 121 each carry radially disposed arms 122 upon the ends of which are affixed weights or fly balls 123, these arms being urged to an inward position such as that illustrated in Fig. 7 as by means of springs 124.

It will be noted that for each of the worm gears 118 there is provided a pair of worms 119. The worm gear 118 is formed with a right-hand pitch for half of its periphery and a left-hand pitch for the remainder of its periphery and the two worm gears 119 are similarly made right and left handed. Thus, as the fly balls 123 move outwardly relative to the shaft 87, the worms 119 will be rotated in opposite directions but being of opposite hand will both tend to produce an angular shifting of the worm gear 118 in the same direction about the stub shaft 110. This angular shifting of the worm gear 118 occurs as a result of rotating the rotatable member 95 at a predetermined speed sufficient to permit the centrifugal force applied to the fly balls 123 to overcome the effect of the springs 124. The angular shift of the worm gear 118 similarly shifts the spider 116, and through the spider gears 114 and 115 and the gears 111 and 112 shifts the ring gears 107 and 113 relative to each other. This shifting of the ring gears applies to the gears 102, 103 and 105, 106 a torque tending to resist rotation of the same. Thus, the rotatable member 95 transmits a corresponding torque directly to the ring gears 89 and 90 and produces a rotation of these ring gears.

Proper adjustment of the springs 124 and the weights 123 provides for a positive interconnection of the motor shaft 87 with the pulley rim member 92 some time prior to the shaft 87 being accelerated to its normal speed.

This device is particularly adaptable for use where fixed loads such as compressors, crushers and the like are to be driven from an electric motor since it permits the motor to start unloaded and operates to gradually apply the load to the motor as the motor accelerates, the motor being positively connected to the load by the time the motor has accelerated to its full and normal speed.

Attention is also directed to the fact that the device is in effect torque limiting. In other words, if a sufficient resistance to rotation be applied to the pulley rim 92, the ring gears 89 and 90 will be slowed down and the gears 111 and 112 begin to rotate so as to produce a reduced drive ratio between the shaft 87 and the pulley rim 92 serving to protect the motor 85 from the application thereto of torques greater than that capable of being developed by the motor 85.

The gear arrangement including the spider gears 114 and spider 116 just described comprises one mechanism which may be used to angularly shift the ring gears 89 and 90 relative to each other to produce the previously described opposing torque which produces the driving engagement. While it is realized that other forms of mechanism may be used for shifting the ring gears 89 and 90, preference is expressed for the form shown because it provides for a large mechanical advantage permitting relatively light weight fly balls 123 to produce a sufficient torque.

From the foregoing it will be observed that I have provided a power transmission system which serves to provide an unlimitedly variable drive ratio between the power in-put and power take-off shafts.

It will also be observed that the mechanism of my invention is particularly adaptable for automatic control, either torque responsive or speed responsive.

While I have in the foregoing described only the use of automatic control mechanism, it will be obvious to those skilled in the art that the ring members 25 or 25a or the spider 116 may be shifted as described by means of a manual control mechanism instead of an automatic control mechanism if such manual control is desired.

While I have shown and described the preferred embodiment of my invention, I do not desire to be limited to any of the details of construction shown or described herein, except as defined in the appended claims.

I claim:

1. In a transmission including a driven shaft and a power take-off shaft, a driven gear on one of said shafts, a rotatable member on the other of said shafts, a pair of idler gears rotatably supported on said rotatable member in a position meshing with said driven gear, a spider gear drivably engaged with both of said idler gears, a support mounting said spider gear for rotation, and mounting means mounting said support on said rotatable member for pivotal movement relative thereto about the axis of said idler gears, whereby movement of said support angularly shifts one of said idler gears relative to the other.

2. In a transmission including a driven shaft and a power take-off shaft, a driven gear on one of said shafts, a rotatable member on the other of said shafts, a pair of idler gears rotatably supported on said rotatable member in a position meshing with said driven gear, a pair of coaxial control gears each coupled to an idler gear to be rotated in opposite directions by rotation of one of said shafts relative to the other, a spider gear interposed between and meshing with both of said control gears, a spider carried by said rotatable member and journaling said spider gears for rotation, and means mounting said spider for angular movement of the axis of said spider gears about the axis of said control gears as a center.

3. In a transmission including a driven shaft and a power take-off shaft, a driven gear on one of said shafts, a rotatable member on the other of said shafts, a pair of idler gears rotatably supported on said rotatable member in a position meshing with said driven gear, means on said rotatable member engaging said idler gears for angularly shifting one of said idler gears relative to the other, and torque means responsive to load imposed on said power take-off shaft in excess of a predetermined load for so shifting one of said idler gears.

4. In a transmission including a driven shaft and a power take-off shaft, a driven gear on one of said shafts, a rotatable member on the other of said shafts, a pair of idler gears rotatably supported on said rotatable member in a position meshing with said driven gear, means on said rotatable member engaging said idler gears for angularly shifting one of said idler gears relative to the other, torque means responsive to load imposed on said power take-off shaft in excess of a predetermined load for so shifting one of said idler gears, and means responsive to rotation of said driven shaft at a speed higher than a predetermined speed for so shifting said one of said idler gears irrespective of operation of said torque means.

5. In a transmission including a driven shaft and a power take-off shaft, a driving gear on said driven shaft, planet gears coupling said driving gear to said power take-off shaft, a driven gear rotatable on said driven shaft and including means supporting said planet gears for orbital movement about said driving gear, a rotatable member on said driven shaft, a pair of idler gears rotatably supported on said rotatable member in a position meshing with said driven gear, and means on said rotatable member engaging said idler gears for angularly shifting one of said idler gears relative to the other.

6. In a transmission including a driven shaft and a power take-off shaft, a driving gear on said driven shaft, planet gears coupling said driving gear to said power take-off shaft, a driven gear rotatable on said driven shaft and including means supporting said planet gears for orbital movement about said driving gear, a rotatable member on said driven shaft, a pair of idler gears rotatably supported on said rotatable member in a position meshing with said driven gear, a pair of coaxial control gears each coupled to an idler gear to be rotated in opposite directions by rotation of one of said shafts relative to the other, a spider gear interposed between and meshing with both of said control gears, a spider carried by said rotatable member and journaling said spider gear for rotation, and means mounting said spider for angular movement of the axis of said spider gear about the axis of said control gears as a center.

7. In a transmission including a driven shaft and a power take-off shaft, a driving gear on said driven shaft, planet gears coupling said driving gear to said power take-off shaft, a driven gear rotatable on said driven shaft and including means supporting said planet gears for orbital movement about said driving gear, a rotatable member on said driven shaft, a pair of idler gears rotatably supported on said rotatable member in a position meshing with said driven gear, means on said rotatable member engaging said idler gears for angularly shifting one of said idler gears relative to the other, and means responsive to rotation of one of said shafts at a speed higher than the predetermined speed for so shifting one of said idler gears.

8. In a transmission including a driven shaft and a power take-off shaft, a driving gear on said driven shaft, planet gears coupling said driving gear to said power take-off shaft, a driven gear rotatable on said driven shaft and including means supporting said planet gears for orbital movement about said driving gear, a rotatable member on said driven shaft, a pair of idler gears rotatably supported on said rotatable member in a position meshing with said driven gear, means on said rotatable member engaging said idler gears for angularly shifting one of said idler gears relative to the other, and torque means responsive to load imposed on said power take-off shaft in excess of a predetermined load for so shifting one of said idler gears.

9. In a transmission including a driven shaft and a power take-off shaft, a driving gear on said driven shaft, planet gears coupling said driving gear to said power take-off shaft, a driven gear rotatable on said driven shaft and including means supporting said planet gears for orbital movement about said driving gear, a rotatable member on said driven shaft, a pair of idler gears rotatably supported on said rotatable member in a position meshing with said driven gear, means on said rotatable member engaging said idler gears for angularly shifting one of said idler gears relative to the other, torque means responsive to load imposed on said power take-off shaft in excess of a predetermined load for so shifting one of said idler gears, and means responsive to rotation of said driven shaft at a speed higher than a predetermined speed for so shifting said one of said idler gears irrespective of operation of said torque means.

10. In a transmission system for connecting a driving shaft and a prime mover to a power take-off shaft, a clutch including a driven shaft and means engageable to drivably connect said driven shaft to said driving shaft, means responsive to rotation of said driving shaft at a speed exceeding a lower predetermined speed for engaging said clutch, a driving gear on said driven shaft, planet gears coupling said driving gear to said power take-off shaft, a driven gear rotatable on said driven shaft and including means supporting said planet gears for orbital movement about said driving gear, a rotatable member on said driven shaft, a pair of idler gears rotatably supported on said rotatable member in a position meshing with said driven gear, means on said rotatable member engaging said idler gears for angularly shifting one of said idler gears relative to the other, and means responsive to rotation of one of said shafts at a speed exceeding a higher predetermined speed for so shifting one of said idler gears.

11. In a transmission system for connecting a driving shaft and a prime mover to a power take-off shaft, a clutch including a driven shaft and means engageable to drivably connect said driven shaft to said driving shaft, means responsive to rotation of said driving shaft at a speed exceeding a lower predetermined speed for engaging said clutch, a driving gear on said driven shaft, planet gears coupling said driving gear to said power take-off shaft, a driven gear rotatable on said driven shaft and including means supporting said planet gears for orbital movement about said driving gear, a rotatable member on said driven shaft, a pair of idler gears rotatably supported on said rotatable member in a position meshing with said driven gear, means on said rotatable member engaging said idler gears for angularly shifting one of said idler gears relative to the other, and torque means responsive to load imposed on said power take-off shaft in excess of a predetermined load for so shifting one of said idler gears.

12. In a transmission system for connecting a driving shaft and a prime mover to a power take-off shaft, a clutch including a driven shaft and means engageable to drivably connect said driven shaft to said driving shaft, means responsive to rotation of said driving shaft at a speed exceeding a lower predetermined speed for engaging said clutch, a driving gear on said driven shaft, planet gears coupling said driving gear to said power take-off shaft, a driven gear rotatable on said driven shaft and including means supporting said planet gears for orbital movement about said driving gear, a rotatable member on said driven shaft, a pair of idler gears rotatably supported on said rotatable member in a position meshing with said driven gear, means on said rotatable member engaging said idler gears for angularly shifting one of said idler gears relative to the other, torque means responsive to load imposed on said power take-off shaft in excess of a predetermined load for so shifting one of said idler gears, and means responsive to rotation of said power take-off shaft at a speed exceeding a higher predetermined speed for so shifting said one of said idler gears irrespective of operation of said torque means.

WILLIAM T. CRODEN.